Sept. 17, 1963     P. SULZER     3,104,219
FUEL ELEMENTS FOR NUCLEAR REACTORS
Filed Oct. 15, 1958
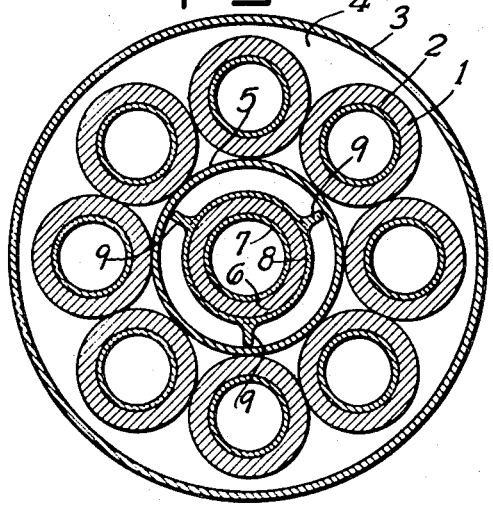
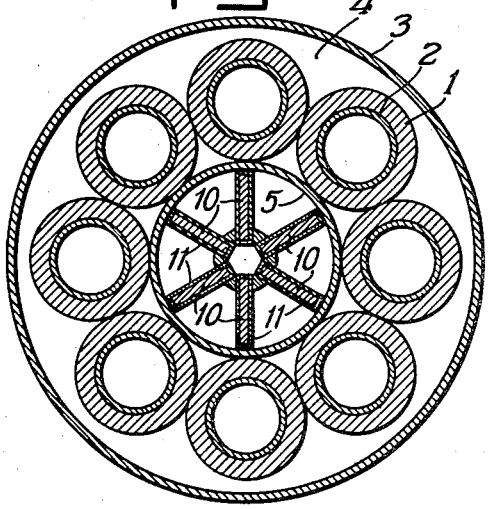
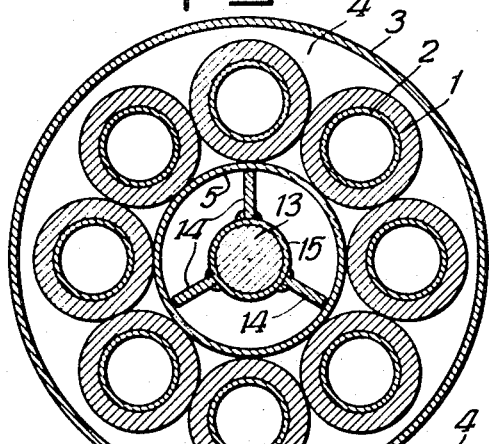
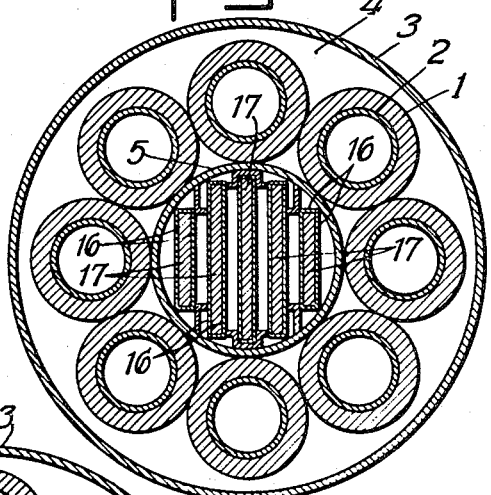
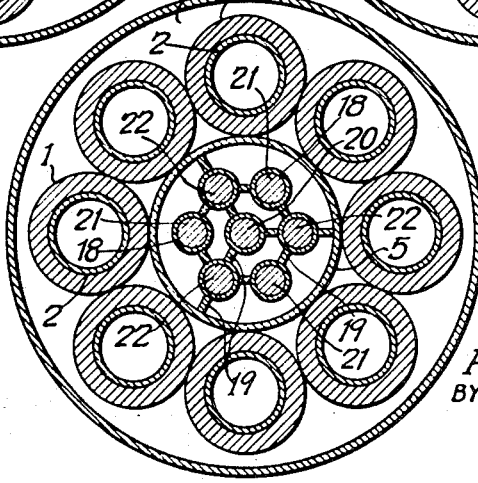
INVENTOR.
PETER SULZER.
BY K. A. Mayr
ATTORNEY.

3,104,219
FUEL ELEMENTS FOR NUCLEAR REACTORS
Peter Sulzer, Hettlingen, near Winterthur, Switzerland, assignor to Sulzer Freres, S.A., Winterthur, Switzerland, a corporation of Switzerland
Filed Oct. 15, 1958, Ser. No. 767,469
Claims priority, application Switzerland Nov. 1, 1957
1 Claim. (Cl. 204—193.2)

The present invention relates to fuel elements for nuclear reactors which elements include an inner fission element surrounded by a plurality of outer fission elements.

According to the invention the inner fission element is made of more active fissionable material than the elements surrounding the inner element whereby the inner element may be made of enriched uranium and the outer elements may be made of natural uranium.

Nuclear reactors including at least one fuel rod constructed according to the invention consume less high active fissionable material, which is expensive and difficult to handle, without sacrificing the advantages obtained by the use of the high active fissionable material with respect to the minimal size of the reactor required for starting the chain reaction and with respect to the permissible limit of burn-up.

Fast neutrons which are emitted by a high active fuel rod arranged inside an envelope formed by other fuel rods are only little retarded, as long as they are still fast, by the fuel rod envelope and leave the fuel element almost unhindered to enter the moderator between the fuel elements. After being slowed down in the moderator to become thermal neutrons the neutrons may produce a fission process in the fissionable material of the fuel elements. Since these thermal neutrons enter the fuel elements from the outside they meet first the envelopes formed of relatively little active material which is now primarily involved in the nuclear reaction and burnt up.

The heat is preferably removed from the fuel elements by means of a heat carrier which flows through cooling conduits in the fuel elements whereby the surfaces of the conduits are in heat conducting contact with the fissionable material. In this way excessive heating of the inner zones of the fuel elements, in which zones the rods made of relatively high active fissionable material are located, is prevented.

The cooling conduits may be formed, at least in part, by cooling tubes which are embedded in the fissionable material.

The novel features which are considered characteristic of the invention are set forth with particularity in the appended claim. The invention itself, however, and additional objects and advantages thereof will best be understood from the following description of embodiments thereof when read in connection with the accompanying drawing in which:

FIGS. 1 to 5 are cross sectional illustrations of five modifications of fuel elements according to the invention.

Each of the FIGURES 1 to 5 shows a cross section of a fuel element according to the invention. In all modifications the envelope surrounding the inner fuel rod is formed by eight individual fuel rods 1, each rod having a cooling tube 2 embedded therein. An outer can 3 surrounds the envelope formed by the rods 1 around an inner can 5 and is spaced from the rods 1, leaving a space 4. The cans 3 and 5 are made of a material which is permeable to neutrons, the space 4 serving as a heat insulation and as a protection of the rods 1 against corrosion. The cooling tubes 2 and the tube 5 forming the inner can are used as cooling channels through which a heat carrier is conducted.

The aforedescribed outer parts of the fuel elements according to the invention may be changed as to number and shape of the rods 1 which are made of fissionable material without departing from the scope of the present invention. The invention is primarily concerned with a combination of different inner parts of fuel elements with the outer parts which are shown alike in all figures, the inner parts being located within the inner tube 5.

In the embodiment shown in FIG. 1 a tubular rod 6 made of $U^{238}$ enriched by $U^{235}$ is surrounded by an outer tube 8 whose cooling surface is enlarged by cooling ribs 9 which also serve for centering the rod 6 in the tube or can 5. A cooling tube 7 is embedded in the rod 6. The tubes 7 and 8 are preferably made of zirconium. A heat carrier flows through the eight cooling tubes 2 in downward direction, if the element is used in a vertical position, and flows upwards in the tube 7 and in the space between the interior of the can 5 and the envelope tube 8, the velocity of the upward flow being greater than that of the downward flow, because of the smaller flow area available for the upward flow.

In the modification shown in FIG. 2 the inner fuel rod has a star-like cross sectional configuration and is composed of six plate- or strip-like rods 10 made of fissionable material and individually sheathed in a zirconium envelope 11. The zirconium envelopes are welded together at the inner edges of the rods to form a hub-like central portion from which the plates 10 extend like spokes. The strips 10 consist of compressed uranium, the uranium of every other strip being enriched by $U^{233}$.

FIG. 3 shows an embodiment of the invention in which a solid cylindrical rod 13 made of $U^{238}$ highly enriched by $U^{235}$ is placed coaxially of the tube 5. The rod 13 is sheathed in an envelope tube 15 made of aluminum and provided with radially extending ribs 14. The outer rods 1 are made of $U^{238}$ which is less enriched by $U^{235}$ than the material of which the rod 13 is made.

In the structure shown in FIG. 4 the inner rod comprises five spaced oblong plates 17 which are individually surrounded by zirconium envelopes 16 and spaced from one another by suitably shaped spacers made of zirconium. The heat carrier flowing through the tube 5 also flows between the plates 17.

In the modification illustraed in FIG. 5 six outer rods made of fissionable material and individually sheathed in zirconium envelopes 18 are arranged in a circle around a central rod 20 and spaced from one another and from the central rod by means of zirconium ribs 19. All rods are placed within the tube 5 parallel to its longitudinal axis. The central rod 20 contains plutonium. The outer rods 21 which are interspersed between the outer rods 22 are made of natural uranium enriched by $U^{233}$, the rods 22 consisting of $U^{238}$ highly enriched by $U^{235}$. The eight rods 1 forming the envelope for the rod structure within the tube 5 are made of $U^{238}$ which is relatively little enriched by $U^{235}$.

The invention is not limited to the illustrated and described embodiments. The fuel rods may be shaped and arranged differently and different fissionable and structural materials than those described may be used. Any suitable conventional heat carrier may be used and conducted through the elements in a manner which is different from that which is described above.

What is claimed is:
A canned unitary fuel element assembly for a nuclear reactor comprising the combination of a central inner fuel rod made of material containing atoms fissionable by neutrons of thermal energy and consisting of uranium enriched with $U^{233}$ with a multi-tube envelope surrounding said inner enriched uranium rod, said multi-tube envelope consisting of a plurality of hollow tubular outer fuel rods adjacent to each other and circumferentially disposed in longitudinal contact with each other about the central inner fuel rod and each having a cooling conduit passing therethrough, said outer fuel rods being also made of ma- terial containing atoms fissionable by neutrons of thermal energy and consisting of natural uranium, the assembly being such that the macroscopic fission cross-section of the material of the central inner rod to neutrons of thermal energy is greater than that of the fissionable material of the several tubular fuel rods forming the surrounding envelope of said fuel element assembly.

References Cited in the file of this patent

UNITED STATES PATENTS 2,841,545 Zinn _____ July 1, 1958
2,852,460 Abbott et al. _____ Sept. 16, 1958
2,879,216 Hurwitz et al. _____ Mar. 24, 1959
2,890,158 Ohlinger et al. _____ June 9, 1959

OTHER REFERENCES

Murray: Nuclear Reactor Physics, 1957, page 20, Prentice-Hall, Inc.

IDO–16255, Mar. 19, 1956.

Developmental Fast Breeder Reactor, Amorosi et al., 1955, published by Atomic Industrial Forum, Inc.

TID–7506 (Part 1), July 1956, pp. 127–164, 171–183.